(12) United States Patent
Donelson et al.

(10) Patent No.: US 6,492,053 B1
(45) Date of Patent: Dec. 10, 2002

(54) PLANAR FUEL CELL ASSEMBLY

(75) Inventors: Richard Donelson, Mount Waverley (AU); Darren Bawden Hickey, Mount Waverley (AU)

(73) Assignee: Ceramic Fuel Cells Limited, Noble Park (AU)

( * ) Notice: Subject to any disclaimer, the term of this patent is extended or adjusted under 35 U.S.C. 154(b) by 0 days.

(21) Appl. No.: 09/445,735

(22) PCT Filed: Jun. 10, 1998

(86) PCT No.: PCT/AU98/00437

§ 371 (c)(1),
(2), (4) Date: Apr. 10, 2000

(87) PCT Pub. No.: WO98/57384

PCT Pub. Date: Dec. 17, 1998

(30) Foreign Application Priority Data

Jun. 10, 1997 (AU) .......................................... PO 7249

(51) Int. Cl.⁷ ................................................. H01M 2/02
(52) U.S. Cl. ............................ 429/34; 429/35; 429/38; 429/12; 429/13
(58) Field of Search ............................. 429/12, 13, 34, 429/35, 38

(56) References Cited

U.S. PATENT DOCUMENTS

| | | | |
|---|---|---|---|
| 4,983,472 A | 1/1991 | Katz et al. ..................... | 429/38 |
| 4,997,727 A | * 3/1991 | Bossel .......................... | 429/33 |
| 5,273,837 A | * 12/1993 | Aitken et al. .................. | 429/30 |
| 5,350,642 A | 9/1994 | Akagi ........................... | 429/32 |
| 5,942,349 A | 8/1999 | Badwal et al. .................. | 429/34 |

* cited by examiner

Primary Examiner—Carol Chaney
Assistant Examiner—Dah-Wei D. Yuan
(74) Attorney, Agent, or Firm—Dorsey & Whitney LLP (57) ABSTRACT

A fuel cell assembly (10) comprising a stack of a plurality of planar fuel cells (16) each comprising an electrolyte layer (20) having an anode layer (18) on one side and a cathode layer (22) on the other side and a plurality of interconnect members (12, 14), each fuel cell (16) being disposed between and in electrical contact with an adjacent pair of interconnect members (12, 14) with oxygen-containing gas passage means (28) being formed between the cathode layer (22) of each fuel cell (16) and the adjacent interconnect member (14) and fuel gas passage means (38, 42) being formed between the anode layer (18) of each fuel cell (16) and the adjacent interconnect member (12), and wherein a chamber (36) of greater height than the thickness of the respective fuel cell (16) is defined between the adjacent interconnect members (12, 14) in each pair within which the fuel cell (16) is received, and electrically conductive compressible means (32, 38, 40, 42) also disposed within the chamber (36) in electrical contact with a first side (18) of the fuel cell (16) and the adjacent interconnect member (12) urges the fuel cell (16) towards the adjacent interconnect member (14) on the second side (22) thereof to maintain the fuel cell (16) in electrical contact with both adjacent interconnect members (12, 14). The fuel cell assembly (10) may comprise a single fuel cell (16) between two interconnect members (12, 14). The compressible means (32) may comprise a corrugated sheet (42) of Ni or Ni alloy.

47 Claims, 9 Drawing Sheets

PLANAR FUEL CELL ASSEMBLY

The present invention relates to a fuel cell assembly comprising a stack of a plurality of planar fuel cells, and is particularly concerned with such a fuel cell assembly in which the compressive load on each fuel cell is independent of its position in the stack. The invention also extends to a single fuel cell assembly.

A fuel cell assembly comprising a stack of a plurality of planar fuel cells requires interconnect means between each pair of adjacent fuel cells to transfer electrical current and heat from the fuel cells, to facilitate the conveyance of oxygen-containing gas and fuel gas to respective sides of each fuel cell, and to keep the oxygen-containing gas and fuel gas apart.

In a single fuel cell planar fuel cell assembly the interconnect means are effectively terminal plates which transfer electrical current and heat from the fuel cell and facilitate the conveyance of oxygen-containing gas and fuel gas to respective sides of the fuel cell. Likewise, the end interconnect means in a stack of planar fuel cells are effectively terminal plates. However, for convenience, all the aforementioned interconnect means, whether between adjacent fuel cells or terminal plates, will hereinafter be referred to as "interconnect members".

Commonly, the fuel cells and interconnect members have the same cross-sectional area and the electrical contact between the cells and interconnect members and the sealing of respective sides of each fuel cell from each other is maintained by using the force imparted by the weight of the cell(s) and/or interconnect members above any one cell. Thus, the fuel cells are fully load bearing. Examples of such an arrangement are described in international patent applications PCT/AU96/00140 and PCT/AU96/00594. The problem with this approach is that the lower cells in the stack carry greater weight than the upper cells. For a stack with a large number of fuel cells the load on the lower cells can be significant.

The carrying load of a ceramic, such as in a solid oxide electrolyte fuel cell, is much higher in compression than in tension and the fully load-bearing arrangement described above assumes that, in a perfect system, the cells carry only a compressive load. This compression-only model acquires near perfect flatness of all load carrying parts since unevenness will lead to tensile forces in the structure and to the possible breakage of the fuel cells. In practice it is not possible to ensure such a quality of flatness in all of the load carrying parts.

The problem of possible breakage of solid oxide electrolyte fuel cells due to tensile forces applied to them in use has not been very substantial in the past due to the relatively high strength structure of previously proposed fuel cells such as those described in the aforementioned international patent applications. In this type of fuel cell, the solid oxide electrolyte layer is relatively thick compared to the anode and cathode layers applied to respective sides and has substantial strength. However, recent developments have introduced solid oxide electrolyte fuel cells in which the electrolyte layer is considerably thinner and is not a primary load bearing layer. Instead the porous anode layer acts as the primary load bearing layer and uneven or excessive loads applied to these fuel cells can be very destructive.

A further problem with a fuel cell in a stack carrying the full mass of the fuel cells and interconnects above it is that the relatively weak porous electrode layers of the fuel cell may collapse under the load.

European patent application EP 0568991 describes a fuel cell assembly comprising a stack of a plurality of planar fuel cell structures, each comprising a fuel cell and a single interconnect member on one side. Each fuel cell structure is located in a hollow plate and is separated from an adjacent fuel cell structure by a hollow intermediate plate, with the interconnect member of one fuel cell structure being maintained in electrical contact with the anode of an adjacent fuel cell structure by a felt-like nickel metal conductive material disposed in the hollow intermediate plate. Each fuel cell carries the load of the associated interconnect member. Furthermore, each fuel cell structure is compressed between a seal element and inlet defining elements of the adjacent intermediate plates so that increasing compressive loads may still be applied to fuel cells down the stack.

It is an object of the present invention to alleviate the aforementioned disadvantages of the prior art.

According to the present invention there is provided a fuel cell assembly comprising a stack of a plurality of planar fuel cells each comprising an electrolyte layer having an anode layer on one side and a cathode layer on the other side and a plurality of interconnect members, each fuel cell being disposed between and in electrical contact with an adjacent pair of interconnect members with oxygen-containing gas passage means being formed between the cathode layer of each fuel cell and the adjacent interconnect member and fuel gas passage means being formed between the anode layer of each fuel cell and the adjacent interconnect member, and wherein a chamber of greater height than the thickness of the respective fuel cell is defined between the adjacent interconnect members in each pair within which the fuel cell is received, and electrically conductive compressible means also disposed within the chamber in electrical contact with a first side of the fuel cell and the adjacent interconnect member urges the fuel cell towards the adjacent interconnect member on the second side thereof to maintain the fuel cell in electrical contact with both adjacent interconnect members.

By this arrangement, each fuel cell is displaceably received within the respective chamber but for the associated electrically conductive compressible means and the compressive load on each fuel cell is provided by the respective compressible means. Thus, the compressive load on each fuel cell is independent of the position of the fuel cell in the stack. This means that a reduced compressive load may be applied to each fuel cell which is particularly advantageous for the aforementioned solid oxide electrolyte fuel cells in which the electrolyte layer is not a primary load bearing layer. It also means that the load conditions in each chamber can be the same throughout the stack, so that the properties of the materials used in the stack do not need to vary according to the position of the fuel cell in the stack.

The invention is also applicable to a fuel cell assembly comprising a single fuel cell. Accordingly, the invention further provides a fuel cell assembly comprising a planar fuel cell having an electrolyte layer with an anode layer on one side and a cathode layer on the other side, the fuel cell being disposed between and in electrical contact with respective interconnect members, oxygen-containing gas passage means being formed between the cathode layer and the adjacent interconnect member and fuel gas passage means being formed between the anode layer and the adjacent interconnect member, and wherein a chamber of greater height than the thickness of the fuel cell is defined between the interconnect members within which the fuel cell is received and electrically conductive compressible means also disposed within the chamber in electrical contact with a first side of the fuel cell and the adjacent interconnect member urges the fuel cell towards the adjacent interconnect member on the second side thereof to maintain the fuel cell in electrical contact with both interconnect members.

The compressible means may take any of a variety of forms which maintain at least a minimum desired compressive force on the fuel cell even at the operating temperature of the fuel cell assembly. It is desirable that the compressible means maintains electrical contact between the fuel cell and the interconnect member during the full life of the fuel cell in use and therefore that it is not subject to more than minimal creep under the compression load. Any creep should not be so great as to cause the electrical contact to be broken.

Preferably the compressible means is disposed on the anode side of the fuel cell. Examples of the metal or metallic material which may be used for or in a compressible means on the anode side of the fuel cell include nickel, nickel alloy such as nickel-chrome and nickel-aluminium, and oxide dispersion strengthened nickel. Alternatively, the nickel may be replaced by other suitable metal or metals from Groups 8–11 of the Periodic Table.

Possible examples of the compressible means for use on the anode side of the fuel cell include a structure, such as a metallic corrugation or a porous metallic felt, which retains some resilience at the operating temperature; and a composite of a porous brittle material and a metal.

The composite of brittle material, such as a ceramic, and a metal may be designed such that the brittle material yields at, the applied loading but does not fail completely so that it will maintain pressure on the fuel cell between upper and lower limits. The metal maintains the electrical path, and preferably a heat path, through the composite and may provide reinforcement for the brittle material.

Preferably the compressible means is resilient so that a compressive load may be maintained during, for example, temperature cycling of the fuel cell assembly. In a preferred embodiment, the resistance is provided by a corrugated metal or metallic sheet, optionally with a substantially flat sheet of metal or metallic material disposed between the corrugated sheet and the first side of the fuel cell to alleviate any sliding movement between the corrugated sheet and the first side of the fuel cell as the corrugated sheet is compressed.

The flat sheet must permit the gas to contact the first side of the fuel cell and may be porous or otherwise have gas flow passages therethrough. Preferably, the flat sheet is formed of expanded material, that is with an array of slits formed in the material and the sheet being stretched to open up the slits.

If the gas passage means on the first side of the fuel cell is formed between the adjacent interconnect member and the corrugated sheet, the corrugated sheet must be porous or otherwise have gas flow passages therethrough. In the preferred embodiment, the corrugated sheet is formed of expanded material. However, the corrugated sheet may be used to define the gas passage means, in which case it may not need to have gas flow passages therethrough.

The corrugated sheet may be joined to the adjacent interconnect member, for example by spot welding, in order to control the compressibility of the corrugated sheet. Alternatively, the substantially flat sheet of metal or metallic material may be disposed between the corrugated sheet and the adjacent interconnect member and may be joined to the corrugated sheet by, for example, spot welding. This substantially flat sheet may also be of expanded material or otherwise have gas flow passages therethrough and may be joined to the interconnect member, for example by spot welding.

The compressible layer may alternatively comprise an integral compliant layer on the interconnect member which is adjacent the first side of the fuel cell.

For a compressible means on the cathode side of the fuel cell, in addition to having electrical conductivity and porosity the material should be resistant to oxidation, for example a form of ceramic felt or other fibre structure.

Electrically conductive compressible means as described above may also be disposed within the chamber in electrical contact with the second side of the fuel cell and the adjacent interconnect member. Advantageously, compressible means on only one side is disposed on the upper side of the fuel cell.

The chamber for the fuel cell may be defined by a recess in one or both of the adjacent interconnect members, with the interconnect members being electrically insulated from each other around the chamber, and/or by an insulating spacer between the adjacent interconnect members around the chamber. The insulating spacer may be formed of an insulating material, for example a ceramic such as alumina, or, for example, of a conductive material, such as a metal, having an insulating coating or surface layer thereon.

Gas flow channels across one or both sides of the interconnect members for flow of oxygen-containing gas and/or fuel gas to respective sides of the fuel cells may be formed in the interconnect members. To minimise machining or other finishing of the interconnect members, the channels for gas flow to at least the first side of the fuel cell are advantageously defined by the compressible means, as described above, and the compressible means advantageously contacts a flat side of the adjacent interconnect member. The interconnect member may conveniently be formed of a stainless steel.

The fuel cell assembly may be externally manifolded for the gas flows, for example as described in the aforementioned EP 0568991, but is preferably internally manifolded. Thus, the oxygen-containing gas and fuel gas supply and exhaust passages preferably pass through the interconnect members, and possibly through the aforementioned insulating spacer if provided.

A seal which is advantageously compressible in use is conveniently provided around a peripheral portion of the fuel cell between the second side thereof and the adjacent interconnect member to seal the fuel gas and the oxygen-containing gas in the chamber from each other. Since the electrode layers may have a degree of porosity, it is desirable for the electrode layer on the second side of the fuel cell, preferably the cathode layer as described above, to not extend into the peripheral portion of the fuel cell, so that the seal engages the electrolyte layer. Preferably, when the compressible means is provided on only the first side of the fuel cell, the seal is compressible in use to the extent that the electrode on the second side of the fuel cell abuts and makes electrical contact with the adjacent interconnect member at the operating temperature. In a preferred embodiment, the seal is solid at room temperature, and therefore during assembly, but becomes viscous at the operating temperature, for example 700° C. to 1,000° C., of the fuel cell assembly. Advantageously, the seal is a glass-containing gasket which may comprise plural layers of glass containing material.

The seal, or a separate seal member, may extend between the adjacent interconnect members or between the interconnect member adjacent the second side of the fuel cell and the aforementioned insulating spacer. A further seal member, which may be thinner than the seal and/or the first-mentioned seal member may be provided between the insulating spacer and the interconnect member adjacent the first side of the fuel cell. The first and second mentioned seal members may be formed of the same or similar material to the seal and may also be compressed in use of the fuel cell assembly.

The or each fuel cell may be one of an array of fuel cells in a respective layer of plural planar fuel cells in the assembly, with each fuel cell being disposed in a chamber in accordance with the present invention. Advantageously, the interconnect members adjacent a common side of all or more than one of the fuel cells in each array are formed in a single plate. Likewise, the aforementioned insulating spacer, if provided, may define partly or wholly all or more than one of the chambers for the fuel cells in each array.

The present invention will be further described by way of example only with reference to the accompanying drawings in which.

Referring to FIGS. 1 to 5, the single fuel cell assembly 10 comprises a pair of spaced interconnect plates 12 and 14 with a single fuel cell 16 between them. The present invention is particularly applicable to a stack of a plurality of fuel cells, but will operate with a single fuel cell and is described accordingly for convenience.

Figure 1:
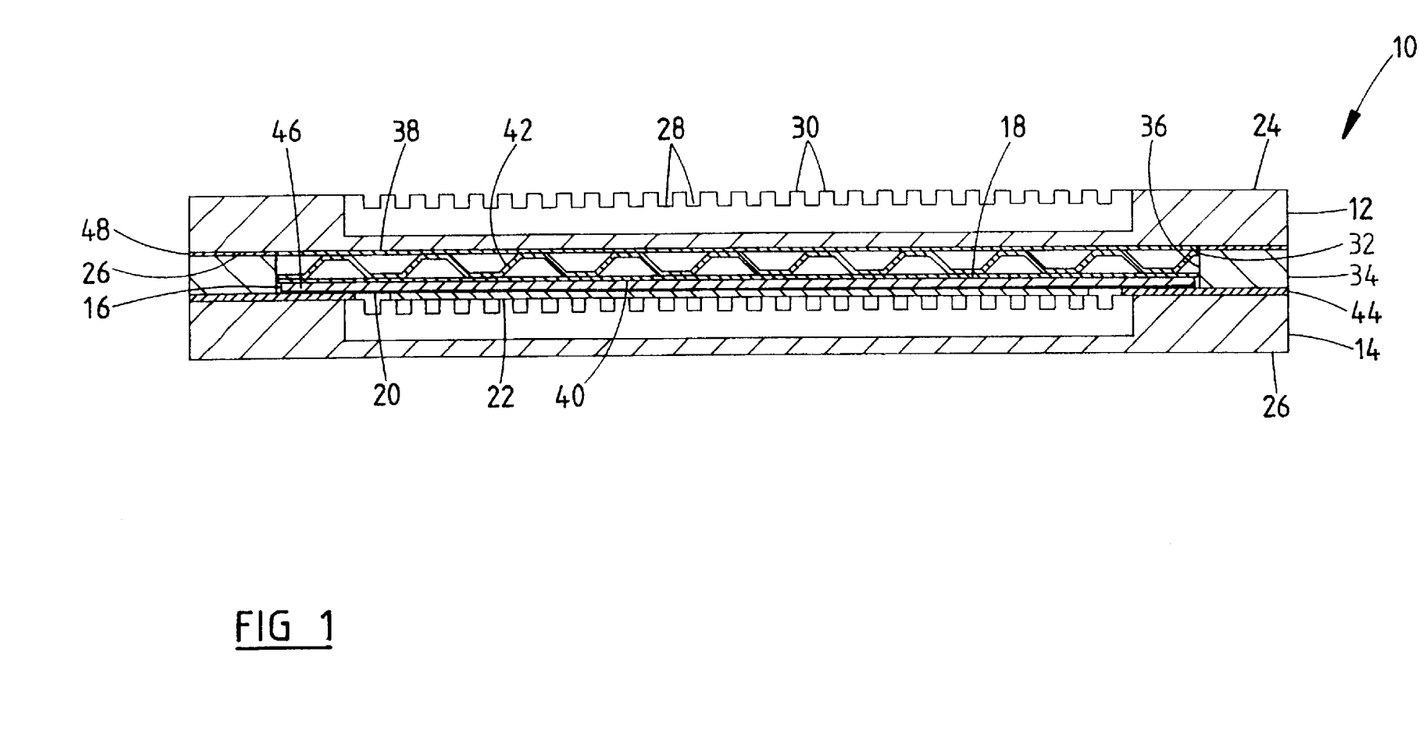
FIG. 1 is a sectional elevation of a fuel cell assembly including one fuel cell, taken on the line A—A of FIG. 2.
Figure 2:
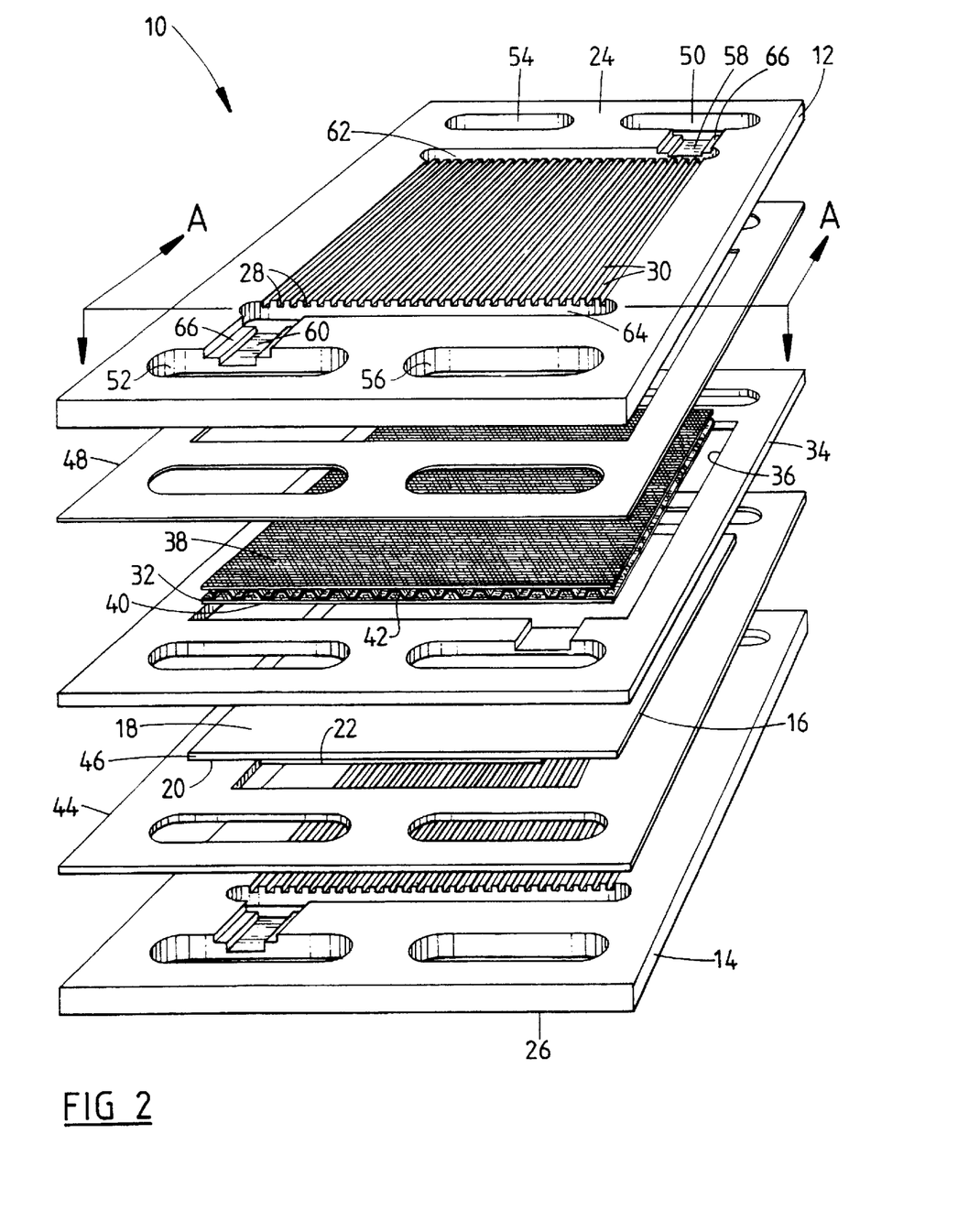
FIG. 2 is an exploded perspective view of the fuel cell assembly of FIG. 1.

The fuel cell 16 is illustrated as of the type in which the anode 18 is the primary load bearing layer with a thin electrolyte layer 20 on one surface and a thin cathode layer 22 applied to the electrolyte layer 20. Such cells are known for intermediate temperature operation of a fuel cell assembly, at around 800° C., but the fuel cell 16 could be replaced by, for example, a fuel cell as described in the aforementioned International patent applications.

In the fuel cell 16, the solid oxide electrolyte layer 20 may comprise $Y_2O_3$-doped $ZrO_2$ (YSZ) having a thickness of about 20 microns laminated on a Ni/YSZ anode having a thickness greater than about 0.5 mm, for example 0.8 to 1.0 mm. The cathode layer 22 may comprise strontium doped lanthanum manganite (LSM) having a thickness of about 50 to 100 microns.

The anode and cathode layers 18 and 22 are porous, and the cathode layer 22 is of reduced area compared to the anode and electrolyte layers 18 and 20, not extending to the periphery of the electrolyte 20, for sealing purposes.

The interconnect plates 12 and 14 may be formed of any of the materials described in the aforementioned International patent applications, but are preferably formed of corrosion resistant stainless steel which has a degree of creep at the operating temperature allowing improved electrical contact and stress relief without optical grinding to provide smooth surfaces. A suitable material is described in our co-pending Australian patent application entitled "A Heat Resistant Steel", the contents of which may be incorporated herein by reference. The stainless steel interconnect plates may be suitably coated to enhance electrical contact. For example, the cathode side 24 may have a coating of La—Sr—$CrO_3$ (LSC), while the anode side 26 may have a nickel coating.

The interconnect plates 12 and 14 are shown ribbed on only the cathode side 24 to facilitate air flow across the cathode layer 22 of the fuel cell 16, and the channels 28 between the ribs 30 may have an alumina coating to minimise corrosion. In the illustrated embodiment, fuel gas flow on the anode side 26 of the interconnect plates is directed by a compression member 32, as described hereinafter, but it could be facilitated by cooperating channels in the anode side 26 of the interconnect plates, or the fuel gas distribution across the anode side 18 of the fuel cell 16 may be performed substantially only by channels on the anode side 26 of the interconnect plates, for example as described in the aforementioned International patent applications.

It will be appreciated that in a single fuel cell assembly as shown in FIG. 1, there will be no air flow across the side 24 of the interconnect plate 12 and no fuel gas flow across the side 26 of the interconnect plate 14, so the channels and ribs 28 and 30 in the interconnect plate 12 may be omitted. Similar considerations apply to the end interconnect plates in a stacked fuel cell assembly. In a stack, further fuel cells 16 are disposed between respective pairs of interconnect plates in the manner described below, with a single interconnect plate disposed between adjacent fuel cells.

The interconnect plates 12 and 14 are spaced apart by an insulating spacer plate 34 having an opening 36 therethrough defining a chamber between the interconnect plates within which the fuel cell 16 is received. The spacer plate may be formed of, for example, alumina or a conducting material such as stainless steel with an insulating coating, for example of alumina. The insulating spacer plate 34 is of greater thickness than the fuel cell 16, and the compression member 32 is disposed between the interconnect plate 12 and the anode layer 18 of the fuel cell 16 within the chamber defined by the opening 36 of the spacer 34. The compression member 32 may be formed of for example nickel or nickel alloy and maintains electrical contact between the interconnect plate 12 and the anode layer 18 of the fuel cell. Additionally, the compression member 32 applies pressure to the fuel cell 16 from the interconnect plate 12 to maintain the cathode layer 22 in electrical contact with the cathode side 24 of the interconnect plate 14. However, this pressure is limited by the spacer plate 34 so that it is independent of the number of fuel cell assemblies which may be above the assembly 10 in a stack. This greatly enhances use of the relatively weak fuel cell 16 compared to the fuel cells described in the aforementioned International patent applications.

The compression member 32 comprises three sheets of superposed expanded nickel mesh. The outer sheets 38 and 40 are flat, but the inner sheet 42 is corrugated. Each of the sheets has a thickness of about quarter of a millimetre, and the overall thickness of the compression member 32 is 1.5 to 2 mm, for example about 1.7 mm.

The corrugated nature of the inner sheet 42 facilitates fuel gas flow across the chamber defined by the opening 36, and the open mesh nature of the expanded sheets allows the distributed fuel gas to contact the anode layer 18 of the fuel cell.

The corrugated inner sheet 42 also gives the member 32 a degree of compressibility through its thickness so as to provide the desired compressive force between the interconnect plate 12 and the fuel cell. The compressive force must be able to be maintained throughout use of the fuel cell, in order to maintain electrical contact between the fuel cell and both interconnect plates 12 and 14, and the inner sheet 42 is advantageously secured to one of the outer sheets 38 and 40, for example by spot welding, to increase the resistance to compression. Advantageously, the inner sheet 42 is spot welded to the outer sheet 38 and the outer sheet 40 alleviates any sliding contact between the inner sheet 42 as it is compressed and the anode layer 18 of the fuel cell. Alternatively, the outer sheet 38 may be omitted and the corrugated inner sheet 42 may be spot welded directly to the interconnect plate 12. Alternatively again, in this embodiment, the outer sheet 40 could also be omitted. Likewise, the corrugated inner sheet 42 could be bonded to one of the outer sheets 38 and 40, as by spot welding, and the other outer sheet may be omitted. It is envisaged that a replacement of the nickel material of the compression member 32 by nickel alloy may improve the desirable characteristics of the compression member.

It is important to seal the air in the chamber on the cathode side of the fuel cell from the fuel gas in the chamber on the anode side, and a seal in the form of a glass containing gasket 44 is seated on the cathode side 24 of the interconnect plate 14 around the air distribution channels 28. The gasket 44 extends fully between the interconnect plate 14 and the spacer plate 34 and also between the interconnect plate 14 and a peripheral region 46 of the fuel cell 16. Since the cathode layer 22 of the fuel cell is porous, it does not extend into the peripheral region 46 and the gasket 44 contacts the fully dense solid oxide electrolyte layer 20 in the peripheral region 46. If desired, the portion of the gasket 44 contacting the peripheral region 46 of the fuel cell could be separate from the portion of the gasket contacting the spacer plate 34. A thinner glass containing gasket 48 is disposed between the spacer plate 34 and the anode side 26 of the interconnect plate 12 to seal the anode side of the chamber.

The gaskets 44 and 48 are conveniently formed of plural layers of glass containing material which is rigid under ambient conditions but which becomes viscous at the operating temperature of the fuel cell. This enables the gaskets 44 and 48, particularly the thicker gasket 44, to compress and thereby ensure the desired seal, with the compression in practice being such as to ensure the cathode layer 22 on the fuel cell is urged by the compression member 32 into contact with the cathode side 24 of the interconnect plate 14. As the gaskets 44 and 48 are compressed, the interconnect plates 12 and 14 move towards each other, but this movement is limited by the spacer plate 34 so that the degree of compression applied to the fuel cell by the compression member 32 is limited and is independent of the position of the fuel cell assembly 10 in a stack of fuel cells.

Referring now to FIGS. 2 to 5, it may be seen that the fuel cell assembly 10 is internally manifolded, that is manifolds for the oxygen-containing gas and fuel gas extend through the interconnect plates 12 and 14 and the spacer plate 34, as well as through the gaskets 44 and 48. However, this is not essential and the fuel cell assembly 10 could be externally manifolded.

In FIGS. 2 to 5 it may be seen that the oxygen-containing gas inlet manifold 50 and outlet manifold 52 are diagonally opposed to each other so as to ensure proper distribution of the gas across the channels 28. Likewise, the fuel gas inlet manifold 54 and outlet manifold 56 are diagonally opposed to each other to ensure even distribution of the fuel gas across the distribution channels defined by the compression member 32. The flow directions for the oxygen-containing gas and fuel gas are shown parallel, but they could easily be made counterflow by swapping one of the pairs of inlet and outlet manifolds. Likewise, the invention is applicable to a cross flow arrangement, much as described with reference to FIGS. 6 to 10.

Figure 3:
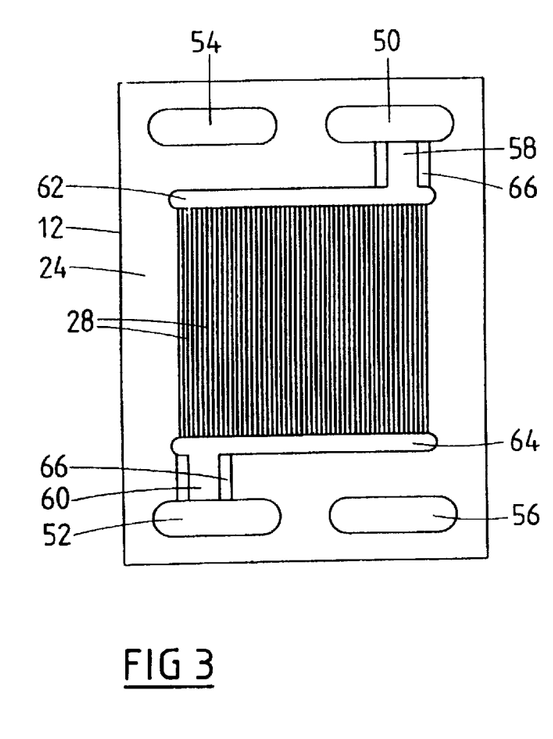
FIG. 3 is a plan view from above of one of the interconnect members shown in FIG. 1.
Figure 4:
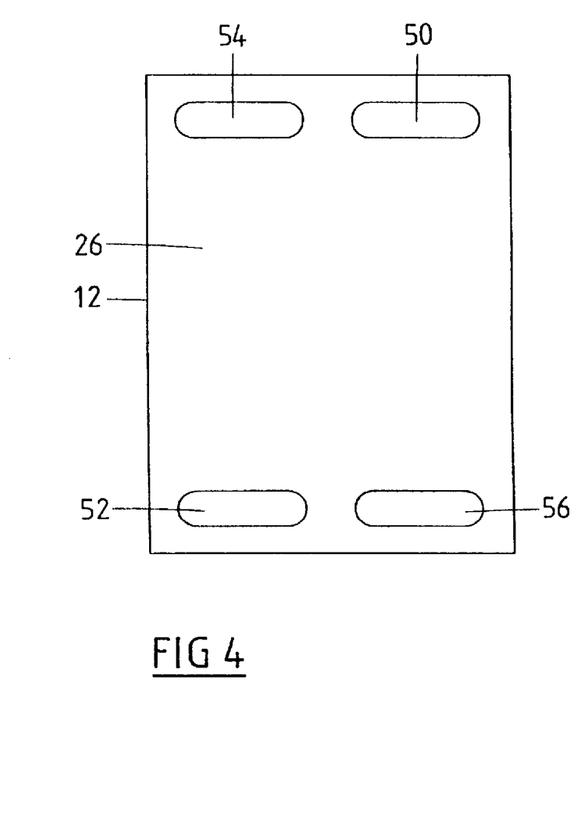
FIG. 4 is a plan view from below of the interconnect member of FIG. 3.

The oxygen-containing gas inlet and outlet manifolds 50 and 52 communicate with the distribution channels 28 in the interconnect plate by way of inlet and outlet passages 58 and 60 and distributors 62 and 64 defined by grooves in the interconnect plate. The inlet and outlet channels 58 and 60 are recessed on each side at 66 to receive a sealing shim (not shown), for example of stainless steel. The gasket 44 may extend over the sealing shim.

Figure 5:
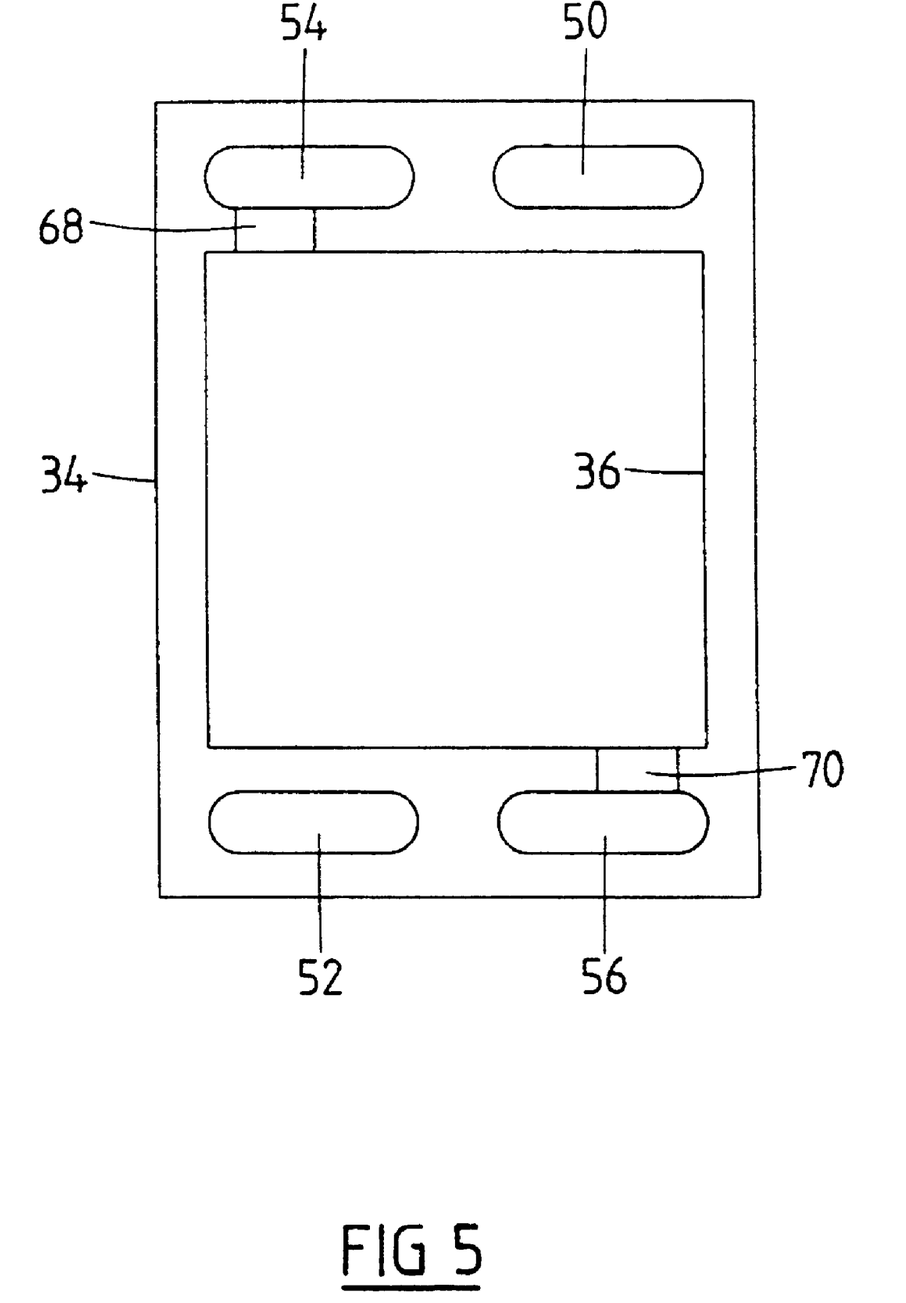
FIG. 5 is a plan view from above of the insulating spacer plate of the assembly of FIG. 1.

In FIG. 5, it may be seen that the spacer plate 34 has fuel gas inlet and outlet passages 68 and 70 defined by respective grooves extending between the manifold passages 54 and 56 therethrough and the opening 36 defining the chamber for the fuel cell 16 and compression member 32.

Referring now to FIGS. 6 to 10, it may be seen that the present invention may be applied also to a fuel cell assembly incorporating a parallel array of, for example, four fuel cells. One interconnect plate 80 and one spacer plate 82 are illustrated for this purpose in FIGS. 6 to 8 and FIGS. 9 and 10 respectively. The fuel cells are not shown, but they will be individual and may be identical to the fuel cell 16 described above.

Figure 6:
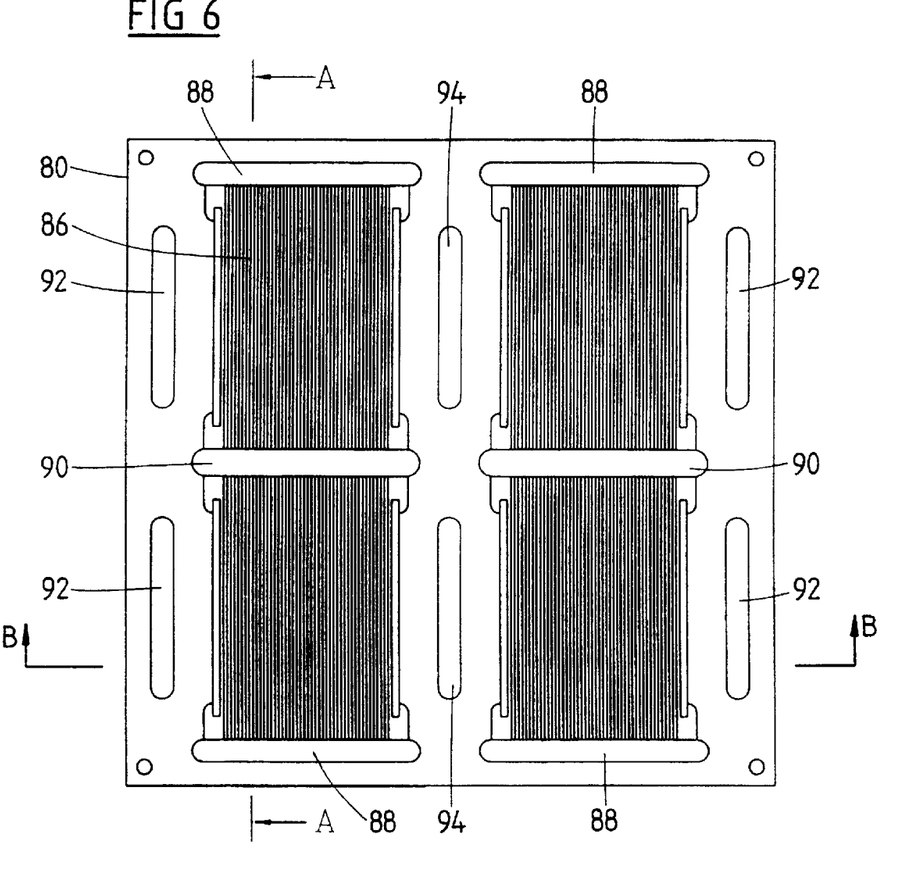
FIG. 6 is a plan view from above of an alternative interconnect plate incorporating four interconnect members for a use in a fuel cell assembly having an array of four parallel sets of fuel cells.
Figure 7:
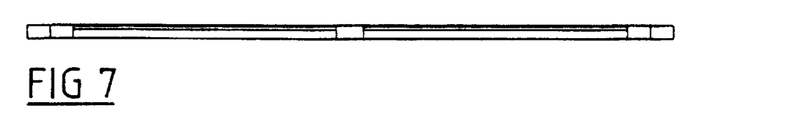
FIG. 7 is a sectional view along the line A—A of FIG. 6.
Figure 8:
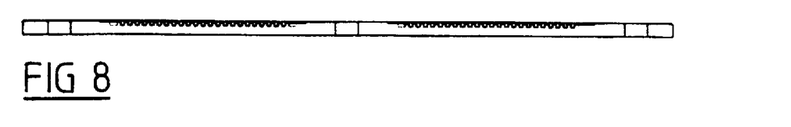
FIG. 8 is a sectional view along the line B—B of FIG. 6.
Figure 9:
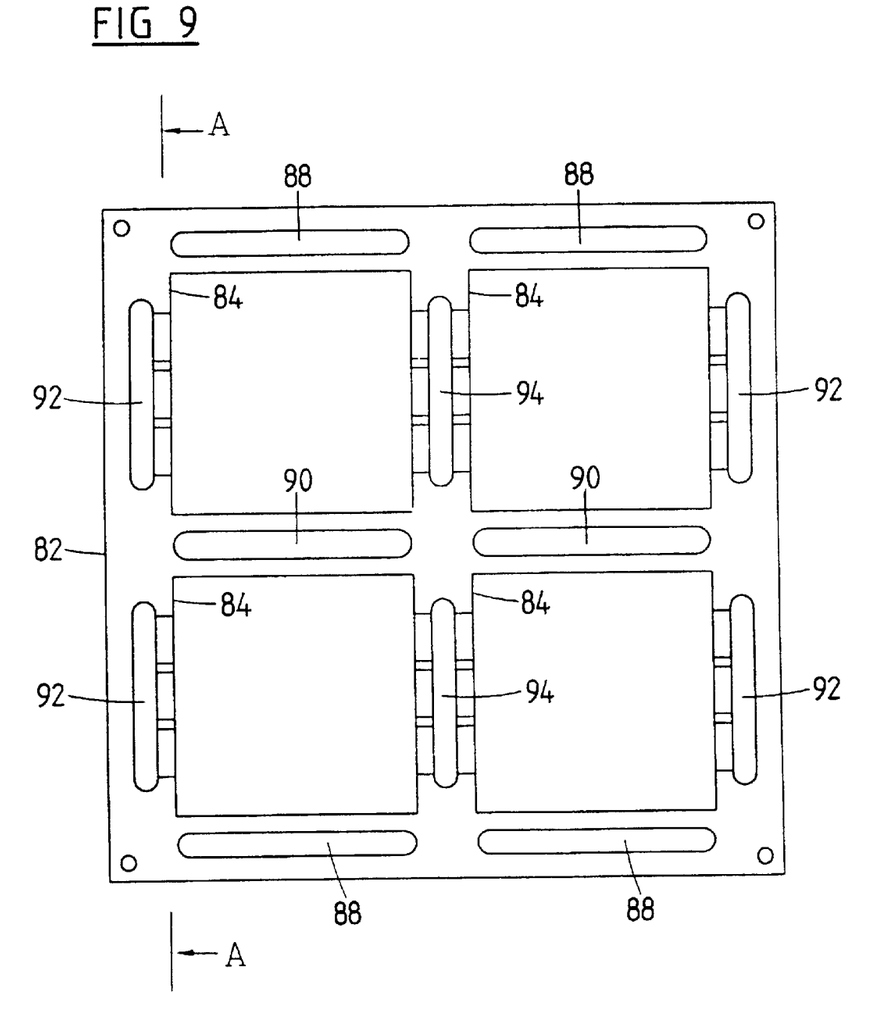
FIG. 9 is a plan view from above of an insulating spacer plate for use with the interconnect plate of FIG. 6.
Figure 10:
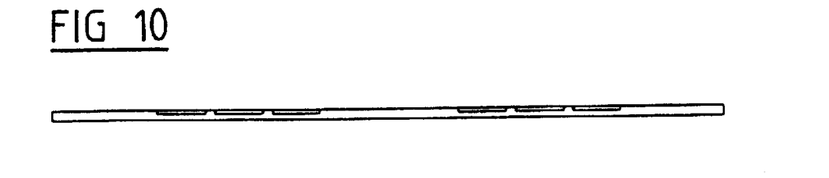
FIG. 10 is a sectional view along the line A—A of FIG. 9.

Likewise, the interconnect plate 80 and spacer plate 82 will be assembled in identical manner as has been described above with correspondingly shaped sealing gaskets above and below the spacer plate 82 extending around the four openings 84 in the spacer plate defining chambers within which respective assemblies of a fuel cell and a compression member such as the member 32 will be received.

The interconnect plate 80 and spacer plate 82 are also internally manifolded, but in a different manner to the manifolding in the fuel assembly 10. In FIGS. 6 to 10, a cross flow arrangement is used so that the compression member 32 would be rotated through 90° compared to its orientation in the fuel assembly 10 with the distribution channels defined by the corrugations of the inner sheet 42 extending perpendicularly to the air side distribution channels 86 in the interconnect plate 80. This arrangement allows the arrayed fuel cell assemblies to be paired for manifolding purposes. Thus, while each array has a respective oxygen-containing gas inlet manifold passage 88 for each fuel cell, respective oxygen-containing gas outlet manifold passages 90 are common to paired fuel cells. Likewise, each array has a respective fuel gas inlet manifold passage 92 for each fuel cell, but fuel gas outlet manifold passages 94 are common to respective pairs of the fuel cells. The manifold passages all extend at least substantially across the full width of the respective opening(s) 84. It will be appreciated that the respective gas flows may be reversed by swapping the inlet and outlet manifold passages.

Two examples will now be given illustrating the performance of the fuel cell assembly 10 illustrated in FIGS. 1 to 5. In Example 1 only a single fuel cell was tested, but in Example 2 the fuel cell assembly comprised a six cell stack. The cell assemblies in the Examples were identical and comprised 50 mm by 50 mm fuel cells, each comprising a Ni/YSZ anode layer of greater than 0.5 mm thickness having a 20 micron YSZ electrolyte layer laminated thereto with a 100 micron LSM cathode layer on the other side of the electrolyte. The compression member in each cell assembly comprise a corrugated expanded nickel mesh with flat sheets of nickel mesh on each side, one of which was spot welded to the corrugated mesh to give a total thickness of about 1.7 mm, each sheet having a thickness of about 230 microns. The interconnect members were corrosion resistant stainless steel having an LSC conducting layer on the ribs and an alumina coating in the distribution channels on the cathode side, and a nickel coating on the fuel side. The composition of the stainless steel was, in wt. %: Cr 26.25–28; C 0.011–0.080; Si 0.01–0.09; Mn 0.01; Ni 0.01; S 0.001–0.002; P 0.002; rare earth metal 0.01–0.15, residue iron, excluding incidental impurities any of which were at trace levels or below. The spacer plate in each fuel cell assembly was of alumina, with a thickness of 2 mm, and the gaskets were of a glass-containing material which became viscous at the operating temperature of 800° C. The thicknesses of the gaskets were adjusted so as to be optimum for providing the desired sealing.

EXAMPLE 1

Figure 11:
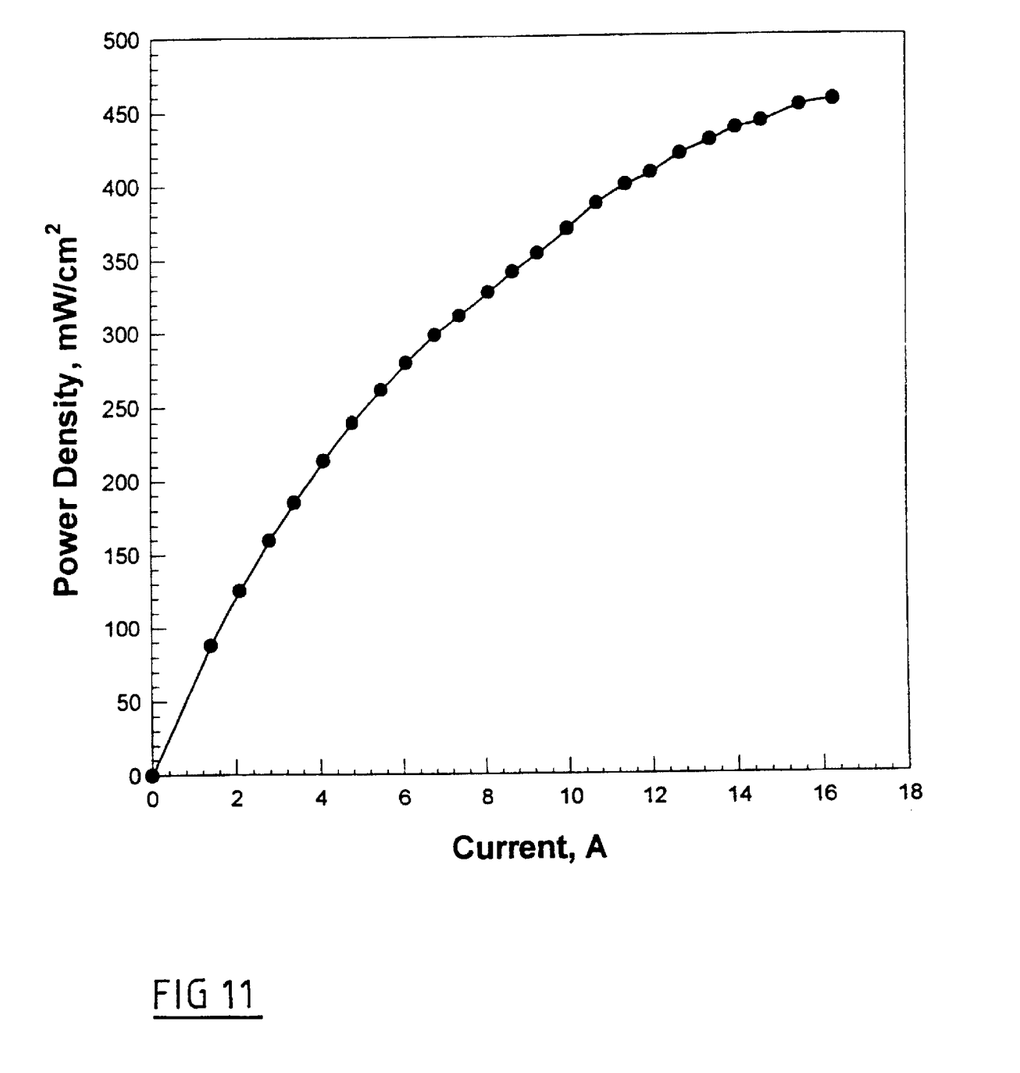
FIG. 11 is a graph showing the power curve for the single cell assembly of Example 1.

After heating the single fuel cell assembly to 800° C., fuel gas (4% water in hydrogen) was passed over the anode via the compression member. Air was used as the oxygen-containing gas. The cell sealed well and reached the theoretical open circuit voltage of 1.084 V. The cell produced a peak power of about 450 mW/cm$^2$ at 16 amps, as shown in FIG. 11. The cell was run for a total of 250 hours, and then terminated for post mortem analysis. In-situ electrochemical diagnostic tests showed low contact resistance, indicative of the compression member having performed well.

EXAMPLE 2

Figure 12:
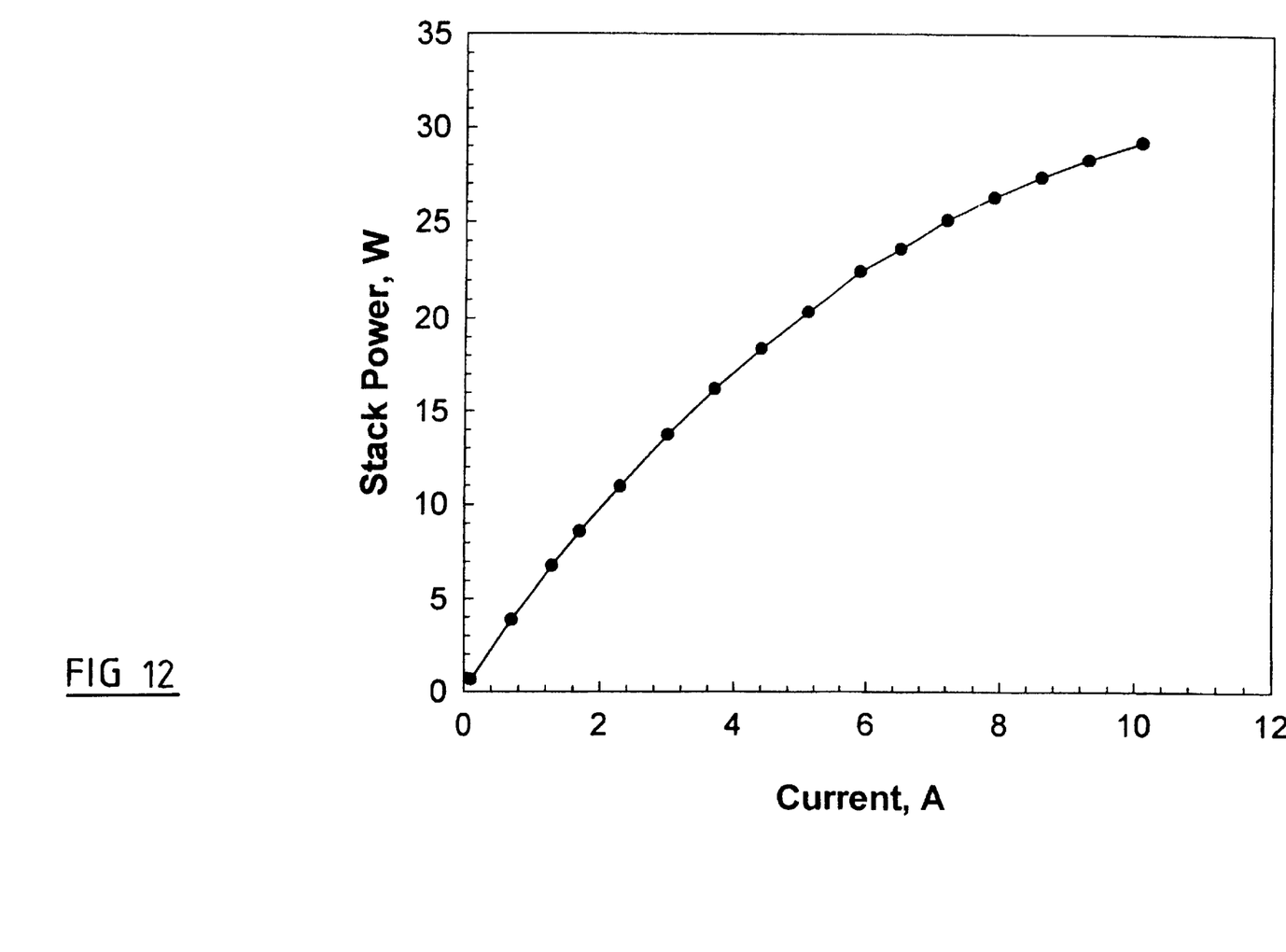
FIG. 12 is a graph showing the power curve for the six cell fuel cell stack of Example 2.
Figure 13:
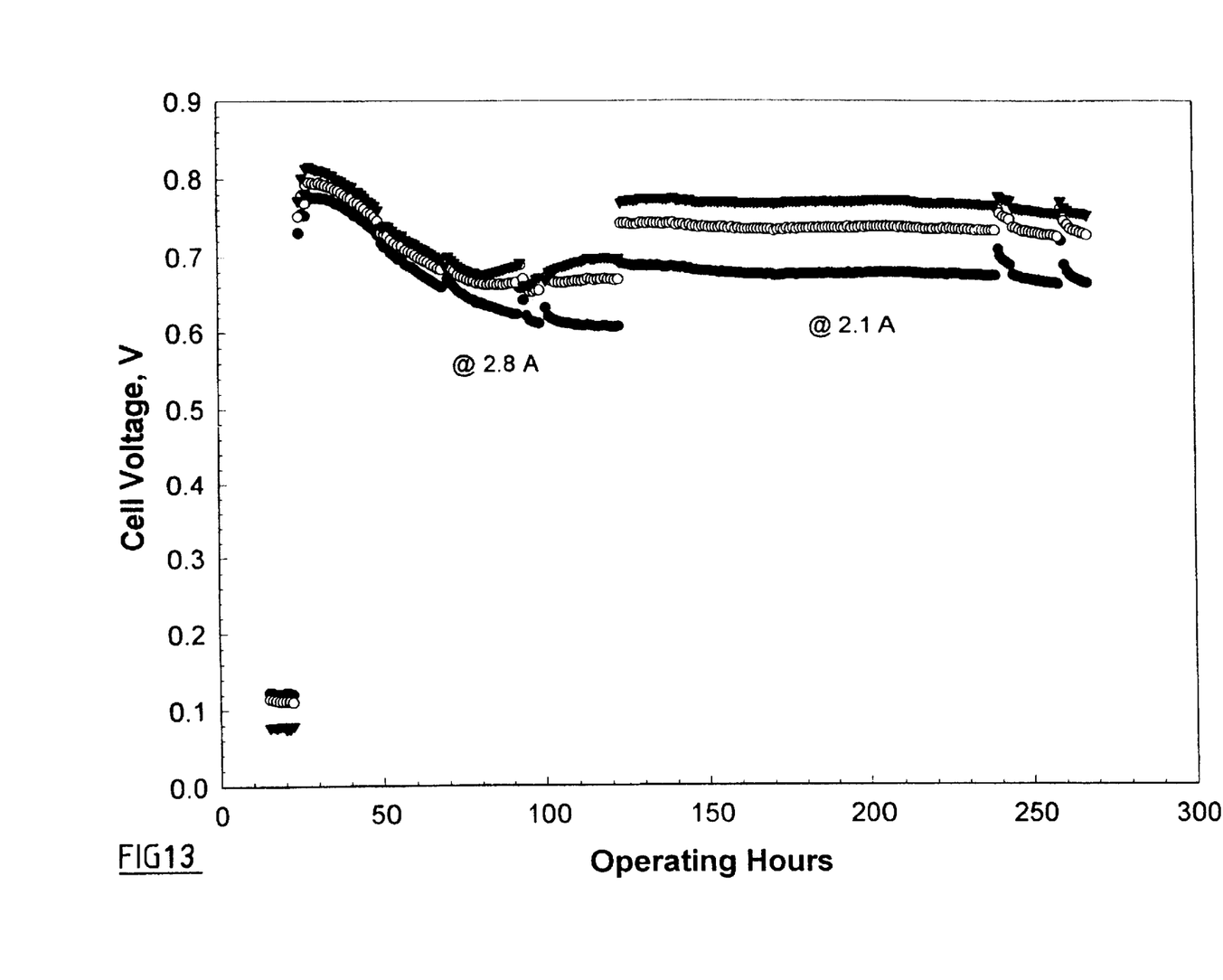
FIG. 13 is a graph showing the time curve for the six cell stack of Example 2.

After assembly of the six fuel cell stack, the stack was heated in the test station to 800° C. Then the stack was tested with 4% water in hydrogen as the fuel gas and air as the oxidant gas. The stack sealed well, with all six cells reaching the theoretical open circuit voltage of 1.084 V. The stack reached a peak power of 29 W at 10 A, as shown in FIG. 12. The stack was then operated at 150 mA/cm$^2$ and 200 mA/cm$^2$ for a period of 250 hours before being shut down for analysis, and the results are shown in FIG. 14. The stack sealed well over the complete test period. In-situ electrochemical tests indicated excellent contact between the cells and the interconnect plates, demonstrating the compression members were working well.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Those skilled in the art will appreciate that the invention described herein is susceptible to variations and modifications other than those specifically described. It is to be understood that the invention includes all such variations and modifications which fall within its spirit and scope as defined by the appended claims.

What is claimed is:

1. A fuel cell assembly comprising a planar fuel cell having an electrolyte layer with an anode layer on one side and a cathode layer on the other side, the fuel cell being disposed between and in electrical contact with respective interconnect members, oxygen-containing gas passage means being formed between the cathode layer and the adjacent interconnect member and fuel gas passage means being formed between the anode layer and the adjacent interconnect member, and wherein a chamber of greater height than the thickness of the fuel cell is defined between the interconnect members within which the fuel cell is received and metallic electrically conductive compressible means also disposed within the chamber in electrical contact with a first side of the fuel cell and the adjacent interconnect member provides compressive force against the fuel cell towards the adjacent interconnect member on a second side thereof to maintain the fuel cell in electrical contact with both interconnect members.

2. A fuel cell assembly according to claim 1 wherein the electrically conductive compressible means is disposed on the anode side of the fuel cell.

3. A fuel cell assembly according to claim 2 wherein the electrically conductive compressible means is formed of a material selected from the group consisting of a metal from Groups 8–11 of the Periodic Table, an alloy of one or more of such metals, and such a metal which has been oxide dispersion strengthened.

4. A fuel cell assembly according to claim 2 wherein the electrically conductive compressible means is selected from a structure which retains some resilience at the operating temperature and a composite of a porous brittle material and a metal.

5. A fuel cell assembly according to claim 4 wherein the electrically conductive compressible means comprises a corrugated sheet selected from the group consisting of metal and metallic material.

6. A fuel cell assembly according to claim 5 wherein a flat sheet selected from the group consisting of metal and metallic material is disposed between the corrugated sheet and the adjacent interconnect member.

7. A fuel cell assembly according to claim 5 wherein the electrically conductive compressible means is joined to the adjacent interconnect member.

8. A fuel cell assembly according to claim 5 wherein the electrically conductive compressible means forms the gas passage means between the first side of the fuel cell and the adjacent interconnect member and contacts a flat side of said adjacent interconnect member.

9. A fuel cell assembly according to claim 1 wherein the electrically conductive compressible means is disposed on the upper side of the fuel cell.

10. A fuel cell assembly according to claim 1 wherein for each fuel cell a seal is provided around a peripheral portion of the fuel cell between the second side thereof and the adjacent interconnect member to seal the oxygen-containing gas and fuel gas in the chamber from each other.

11. A fuel cell assembly according to claim 10 wherein the seal is compressible in use.

12. A fuel cell assembly according to claim 10 wherein sealing means selected from the group consisting of the seal and a separate seal member extends around the chamber to at least partially seal the chamber from the exterior.

13. A fuel cell assembly according to claim 11 wherein the seal is rigid at room temperature and viscous at the cell operating temperature.

14. A fuel cell assembly according to claim 13 wherein the electrode layer on the second side of the fuel cell is initially spaced from the adjacent interconnect member by the rigid seal at room temperature and abuts and makes electrical contact with said adjacent interconnect member at the fuel cell operating temperature as the viscous seal material compresses under load.

15. A fuel cell assembly according to claim 13 wherein the seal is in the form of a glass-containing gasket.

16. A fuel cell assembly according to claim 15 wherein the gasket has plural layers of glass-containing material.

17. A fuel cell assembly according to claim 12 wherein the sealing means is a separate seal member and the separate seal member has the same properties as the seal.

18. A fuel cell assembly according to claim 1 wherein an insulating spacer extends around the fuel cell and the electrically conductive compressible means to at least partly define the chamber.

19. A fuel cell assembly according to claim 1 which is internally manifolded.

20. A fuel cell assembly according to claim 1 wherein the fuel cell is one of an array in a layer of plural planar fuel cells in the assembly, each disposed in a respective said chamber of greater height than the thickness of the fuel cell defined between the interconnect members, a respective said electrically conductive compressible means also being disposed within each said chamber in electrical contact with the first side of the respective fuel cell and the adjacent interconnect member to bias the fuel cell towards the adjacent interconnect member on the second side thereof to maintain the fuel cell in electrical contact with both interconnect members.

21. A fuel cell assembly comprising a stack of a plurality of planar fuel cells each comprising an electrolyte layer having an anode layer on one side and a cathode layer on the other side and a plurality of interconnect members, each fuel cell being disposed between and in electrical contact with an adjacent pair of interconnect members with oxygen-containing gas passage means being formed between the cathode layer of each fuel cell and the adjacent interconnect member and fuel gas passage means being formed between the anode layer of each fuel cell and the adjacent interconnect member, and wherein a chamber of greater height than the thickness of the respective fuel cell is defined between the adjacent interconnect members in each pair within which the fuel cell is received, and metallic electrically conductive compressible means also disposed within the chamber in electrical contact with a first side of the fuel cell and the adjacent interconnect member provides compressive force against the fuel cell towards the adjacent interconnect member on the second side thereof to maintain the fuel cell in electrical contact with both adjacent interconnect members.

22. A fuel cell assembly according to claim 21 wherein for each fuel cell the electrically conductive compressible means is disposed on the anode side of the fuel cell.

23. A fuel cell assembly according to claim 22 wherein the electrically conductive compressible means is formed of a material selected from the group consisting of a metal from Groups 8–11 of the Periodic Table, an alloy of one or more of such metals, and such a metal which has been oxide dispersion strengthened.

24. A fuel cell assembly according to claim 22 wherein the electrically conductive compressible means is selected from a structure which retains some resilience at the operating temperature and a composite of a porous brittle material and a metal.

25. A fuel cell assembly according to claim 24 wherein the electrically conductive compressible means comprises a corrugated sheet selected from the group consisting of metal and metallic material.

26. A fuel cell assembly according to claim 25 wherein a flat sheet selected from the group consisting of metal and metallic material is disposed between the corrugated sheet and the adjacent interconnect member.

27. A fuel cell assembly according to claim 25 wherein the electrically conductive compressible means is joined to the adjacent interconnect member.

28. A fuel cell assembly according to claim 25 wherein the electrically conductive compressible means forms the gas passage means between the first side of the fuel cell and the adjacent interconnect member and contacts a flat side of said adjacent interconnect member.

29. A fuel cell assembly according to claim 21 wherein for each fuel cell the electrically conductive compressible means is disposed on the upper side of the fuel cell.

30. A fuel cell assembly according to claim 21 wherein for each fuel cell a seal is provided around a peripheral portion of the fuel cell between the second side thereof and the adjacent interconnect member to seal the oxygen-containing gas and fuel gas in the chamber from each other.

31. A fuel cell assembly according to claim 30 wherein the seal is compressible in use.

32. A fuel cell assembly according to claim 30 wherein sealing means selected from the group consisting of the seal and a separate seal member extending around the chamber to at least partially seal the chamber from the exterior.

33. A fuel cell assembly according to claim 21 wherein for each fuel cell an insulating spacer extends around the fuel cell and the electrically conductive compressible means to at least partly define the chamber.

34. A fuel cell assembly according to claim 21 which is internally manifolded.

35. A fuel cell assembly according to claim 21 wherein each of said fuel cells is one of an array in a respective layer of plural planar fuel cells in the assembly, each disposed in a respective said chamber of greater height than the thickness of the fuel cell defined between the interconnect members, a respective said electrically conductive compressible means also being disposed within each said chamber in electrical contact with the first side of the respective fuel cell and the adjacent interconnect member to bias the fuel cell towards the adjacent interconnect member on the second side thereof to maintain the fuel cell in electrical contact with both interconnect members.

36. A fuel cell assembly according to claim 23 wherein the metal is nickel.

37. A fuel cell assembly according to claim 25 wherein the corrugated sheet is of expanded material.

38. A fuel cell assembly according to claim 25 wherein a flat sheet selected from the group consisting of metal and metallic material is disposed between the corrugated sheet and the adjacent interconnect member.

39. A fuel cell assembly according to claim 38 wherein the flat sheet is of expanded material.

40. A fuel cell assembly according to claim 30 wherein the seal is in contact with the electrolyte layer of the fuel cell.

41. A fuel cell assembly according to claim 31 wherein the seal is rigid at room temperature and viscous at the cell operating temperature.

42. A fuel cell assembly according to claim 41 wherein the electrode layer on the second side of the fuel cell is initially spaced from the adjacent interconnect member by the rigid seal at room temperature and abuts and makes electrical contact with said adjacent interconnect member at the fuel cell operating temperature as the viscous seal material compresses under load.

43. A fuel cell assembly according to claim 41 wherein the seal is in the form of a glass-containing gasket.

44. A fuel cell assembly according to claim 43 wherein the gasket has plural layers of glass-containing material.

45. A fuel cell assembly according to claim 32 wherein the sealing means is a separate seal member and the separate seal member has the same properties as the seal.

46. A fuel cell assembly according to claim 33 wherein a seal member is disposed between the insulating spacer and the interconnect member adjacent to the first side of the fuel cell.

47. A fuel cell assembly according to claim 35 wherein the interconnect members adjacent a common side of more than one of the fuel cells in each array are formed in a single plate.

* * * * *